United States Patent
Mathis

(10) Patent No.: US 11,408,467 B2
(45) Date of Patent: Aug. 9, 2022

(54) FLEXIBLE COUPLING ASSEMBLY

(71) Applicant: Goodrich Corporation, Charlotte, NC (US)

(72) Inventor: Jeffrey Mathis, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 397 days.

(21) Appl. No.: 16/403,229

(22) Filed: May 3, 2019

(65) Prior Publication Data
US 2020/0347888 A1 Nov. 5, 2020

(51) Int. Cl.
| | |
|---|---|
| *F16D 3/72* | (2006.01) |
| *F16D 3/00* | (2006.01) |
| *F16D 3/04* | (2006.01) |
| *F16D 3/34* | (2006.01) |
| *F16D 3/76* | (2006.01) |

(52) U.S. Cl.
CPC .............. *F16D 3/005* (2013.01); *F16D 3/04* (2013.01); *F16D 3/34* (2013.01); *F16D 3/72* (2013.01); *F16D 3/76* (2013.01); *Y10T 403/7005* (2015.01); *Y10T 403/7088* (2015.01)

(58) Field of Classification Search
CPC ... F16D 3/005; F16D 3/04; F16D 3/34; F16D 3/72; F16D 3/76; Y10T 403/7088; Y10T 403/7005
USPC ...................................................... 464/79, 80
See application file for complete search history.

(56) References Cited

U.S. PATENT DOCUMENTS

| | | | | |
|---|---|---|---|---|
| 1,871,227 | A | * | 8/1932 | Smith ........................ F16D 3/72 464/79 |
| 2,550,580 | A | | 4/1951 | McLeod et al. |
| 2,647,380 | A | * | 8/1953 | Troeger ..................... F16D 3/72 |
| 2,917,910 | A | * | 12/1959 | Herbenar .................. F16D 3/72 |
| 3,149,852 | A | * | 9/1964 | Cashman ............... B23B 31/302 464/80 |
| 4,116,018 | A | * | 9/1978 | Weible ...................... F16D 3/60 |
| 4,265,099 | A | | 5/1981 | Johnson et al. |
| 5,158,504 | A | | 10/1992 | Stocco |
| 5,221,232 | A | * | 6/1993 | Nameny ................... F16D 3/72 464/99 |
| 5,755,622 | A | | 5/1998 | Kanki et al. |

(Continued)

FOREIGN PATENT DOCUMENTS

| | | | |
|---|---|---|---|
| EP | 3315807 A1 | 5/2018 | |
| GB | 1201 | * 5/1858 | ..................... 403/348 |

(Continued)

OTHER PUBLICATIONS

Extended European search report issued in corresponding EP application No. 19212068.1, dated Jul. 13, 2020.

*Primary Examiner* — Greg Binda

(74) *Attorney, Agent, or Firm* — Locke Lord LLP; Joshua L. Jones; Scott D. Wofsy

(57) ABSTRACT

A flexible coupling assembly for a power transmission system including a first shaft defining an axis, configured for connecting to a first rotating member, the first shaft adjoining and passing through a first flexible diaphragm coupling and lockably connecting to a quill shaft by a locking flange and the quill shaft being configured for connecting to a second rotating member, including a first mating portion for receiving the locking flange of the first shaft within a circumferential opening, wherein the quill shaft is disposed within a primary diaphragm coupling shaft.

12 Claims, 4 Drawing Sheets

(56) References Cited

U.S. PATENT DOCUMENTS

| | | |
|---|---|---|
| 9,546,694 B2 | 1/2017 | Julian |
| 2018/0051753 A1 | 2/2018 | Goeke et al. |

FOREIGN PATENT DOCUMENTS

| | | | |
|---|---|---|---|
| GB | 929323 A | 6/1963 | |
| GB | 2043207 A | 10/1980 | |
| SU | 846851 A1 * | 7/1981 | ................ 464/80 |

* cited by examiner

FLEXIBLE COUPLING ASSEMBLY

BACKGROUND

Technological Field

The present disclosure relates to flexible couplings, and more particularly to a flexible coupling assembly including a quill shaft.

Description of Related Art

A variety of devices are known in the transferring torque between two rotating objects and handling various stresses and misalignments. A specific challenge remaining to be solved is how to transmit power between two gearboxes while accommodating misalignment between those gearboxes. When the amount of angular and axial misalignments are both high, a sliding spline can be utilized to limit axial load on the shaft elements. Creating another load path for the axial forces will further limit axial loads thereby maximizing the amount of angle that a coupling can handle. Conventional methods and systems have generally been considered satisfactory for their intended purpose. However, there is still a need in the art for a flexible coupling assembly having improved structure and assembly features. There also remains a need in the art for such couplings and components that are economically viable. The present disclosure may provide a solution for at least one of these remaining challenges.

SUMMARY OF THE INVENTION

A flexible coupling assembly for a power transmission system includes a first shaft defining an axis, configured to connect to a first rotatable member, a first flexible diaphragm coupling configured to have a portion of the first shaft pass axially therethrough, a quill shaft having a circumferential opening configured to receive the first shaft and a locking flange for connecting the quill shaft to the first shaft, the quill shaft further being configured to connect to a second rotating member, and a primary diaphragm coupling shaft positioned radially outward of the quill shaft. The quill shaft can include a second mating portion configured for mating with a second rotating member. The second mating portion can be welded to the quill shaft.

At least one flange adapter can be placed between the primary coupling shaft and the first flexible diaphragm coupling. The flange adapter can be welded to the diaphragm coupling and the flange adapter can be bolted to the primary diaphragm coupling shaft. The at least one flange adapter includes a pin hole there through arranged perpendicular to the axis can be and aligned with a first shaft pin hole for receiving a pin therein configured to lock relative movement of the first shaft and the flange adapter.

The first shaft can abut an outer periphery of the first flexible diaphragm coupling. The locking flange can include at least one radial protrusion for mating with a cutout within the first mating portion of the quill shaft. At least one radial protrusion can include a wedged portion.

The primary diaphragm coupling shaft can include a radial displacement limiter in an inner cavity thereof for regulating radial movement of the quill shaft within the primary diaphragm coupling shaft. The radial displacement limiter can include a deformable material. The radial displacement limiter encloses the quill shaft and abuts against an inner diameter of the primary diaphragm coupling shaft.

The quill shaft can adjoin a second side of a second flexible diaphragm coupling and pass through the second flexible diaphragm coupling. The primary coupling shaft can adjoin a first side of the second flexible diaphragm coupling.

The quill shaft can include a pin hole there through, arranged perpendicular to the axis, and aligned with a primary coupling shaft pin hole for receiving a pin therein configured to lock relative movement of the quill shaft and primary diaphragm coupling shaft during assembly.

The first shaft can include a pin hole there through, arranged perpendicular to the axis, for receiving a pin therein configured to lock relative movement of the first shaft and the flange adapter. The first mating portion can include a pin hole there through. The mating portion of the quill shaft includes a larger outer diameter than an outer diameter of a non-mating portion of the quill shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
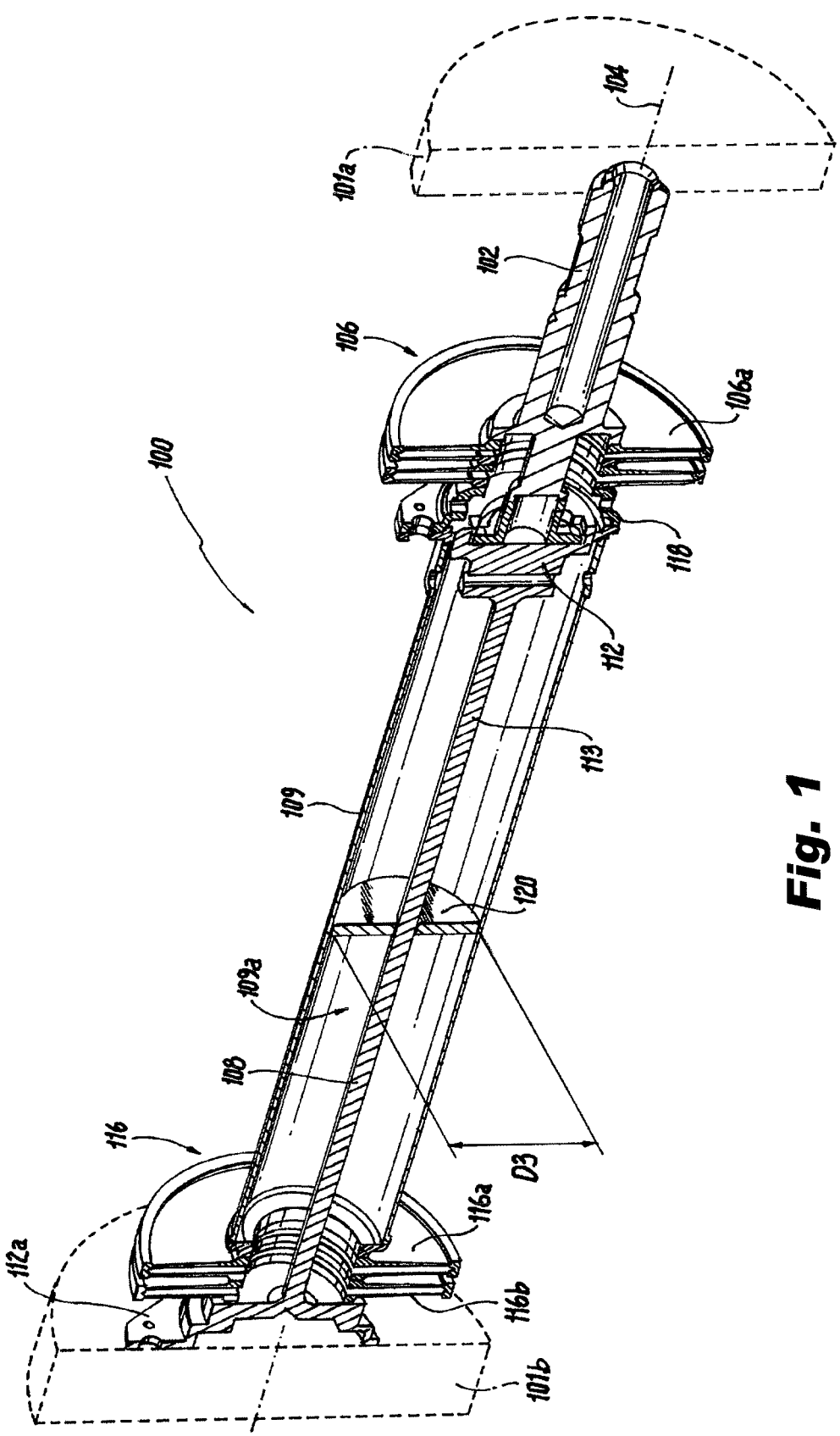
FIG. 1 is a perspective view of a flexible coupling assembly showing a quill shaft.

Reference will now be made to the drawings wherein like reference numerals identify similar structural features or aspects of the subject invention. For purposes of explanation and illustration, and not limitation, a partial view of an exemplary embodiment of a flexible coupling assembly in accordance with the invention is shown in FIG. 1 and is designated generally by reference character 100. Other embodiments of the flexible coupling assembly in accordance with the invention, or aspects thereof, are provided in FIGS. 1a-1c, as will be described. The methods and systems of the invention can be used to transmit torque in a more reliable manner.

As shown in FIG. 1, a flexible coupling assembly 100 for a power transmission system includes a first shaft 102 defining an axis 104, for connecting to a first rotating member 101a. The first shaft 102 adjoins and passes through a first flexible diaphragm coupling 106 and lockably connects to a quill shaft 108 by a locking flange 110 (shown in FIG. 1a). The quill shaft 108 is configured for connecting to a second rotating member 101b and transmitting axial forces. For instance, the first shaft 102 can be connected to an engine and the quill shaft 108 can be connected to a propeller (not shown). The quill shaft 108 includes a first mating portion 112 for receiving the locking flange 110 of the first shaft 102 within a circumferential opening 114 (shown in FIG. 1a). The quill shaft 108 is disposed within a primary diaphragm coupling shaft 109. The first shaft 102 abuts an outer surface 106a of the first flexible diaphragm coupling 106. The primary diaphragm coupling shaft 109 adjoins a first side 116a of a second flexible diaphragm coupling 116 and the quill shaft 108 passes through the second flexible diaphragm coupling 116 and adjoins a second side 116b of the second flexible diaphragm coupling 116.

Referring further to FIG. 1, the quill shaft 108 spans the entire length of the primary diaphragm coupling shaft 109. The quill shaft 108 transmits most of the axial load, thereby allowing the misalignment capability of the flexible couplings to be utilized for angular misalignment. The quill shaft 108 accommodates the same angular misalignment that the primary diaphragm coupling shaft 109 accommodates. The first mating portion 112 of the quill shaft 108 includes an outer diameter D1 (shown in in FIG. 1A) that is larger than an outer diameter D2 of a non-mating portion 113 of the quill shaft 108. The quill shaft 108 further includes a second mating portion 112a for mating with the second rotating member 101b, which can be welded to the quill shaft 108, or secured in another acceptable way.

Referring further to FIG. 1, the primary diaphragm coupling shaft 109 includes a radial displacement limiter 120 in an inner cavity 109a thereof for regulating radial movement of the quill shaft 108. The radial displacement limiter 120 can include a deformable material. The radial displacement limiter 120 encloses at least a portion of the quill shaft 108 and abuts against an inner diameter D3 of the primary diaphragm coupling shaft 109. The displacement limiter 120 limits the radial movement of the quill shaft 108 and improves the buckling and dynamic performance of the quill shaft 108. The radial displacement limiter 120 also allows for longer length quill shaft 108 to be used. It is conceived that various shapes, materials, and various numbers of radial displacement limiters can be used, depending on the size of the primary diaphragm coupling shaft and the length of the quill shaft 108.

Figure 1A:
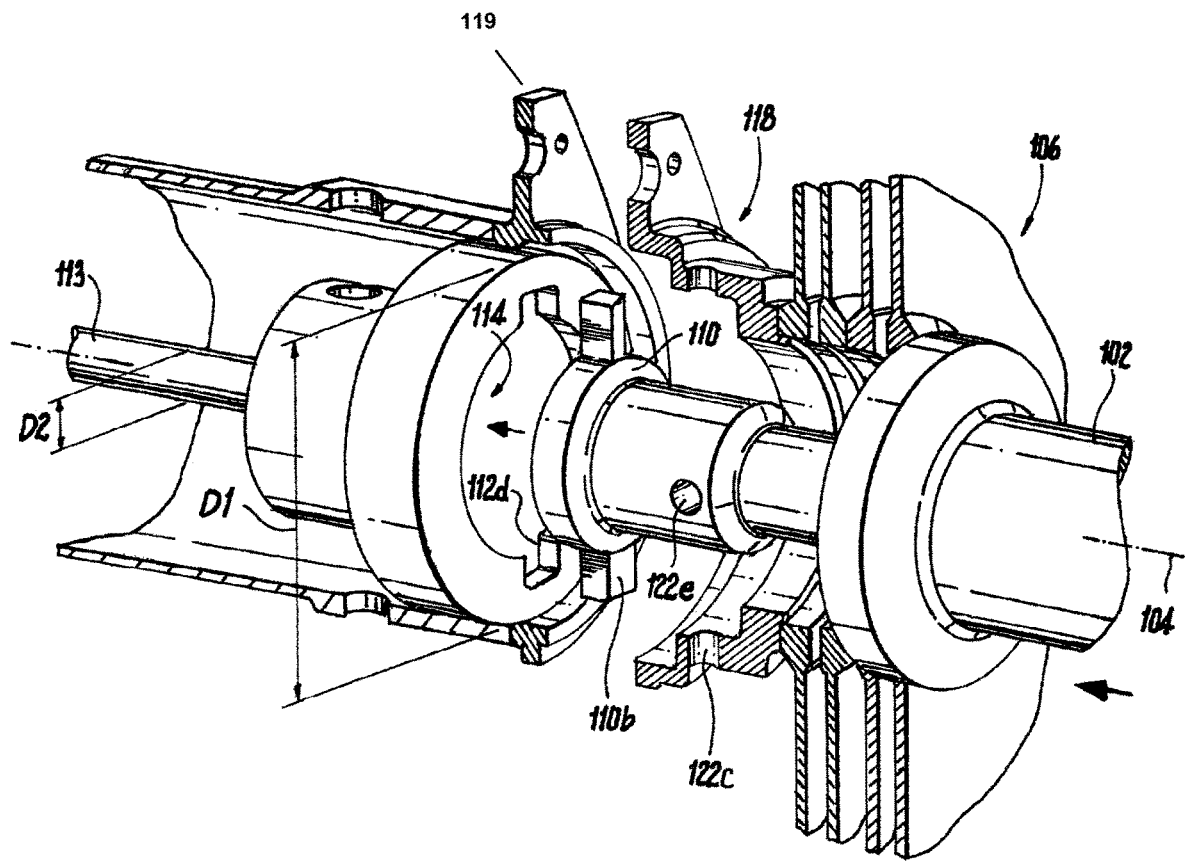
FIG. 1a is a perspective view of FIG. 1, showing the flexible coupling assembly in a disjointed state.
Figure 1B:
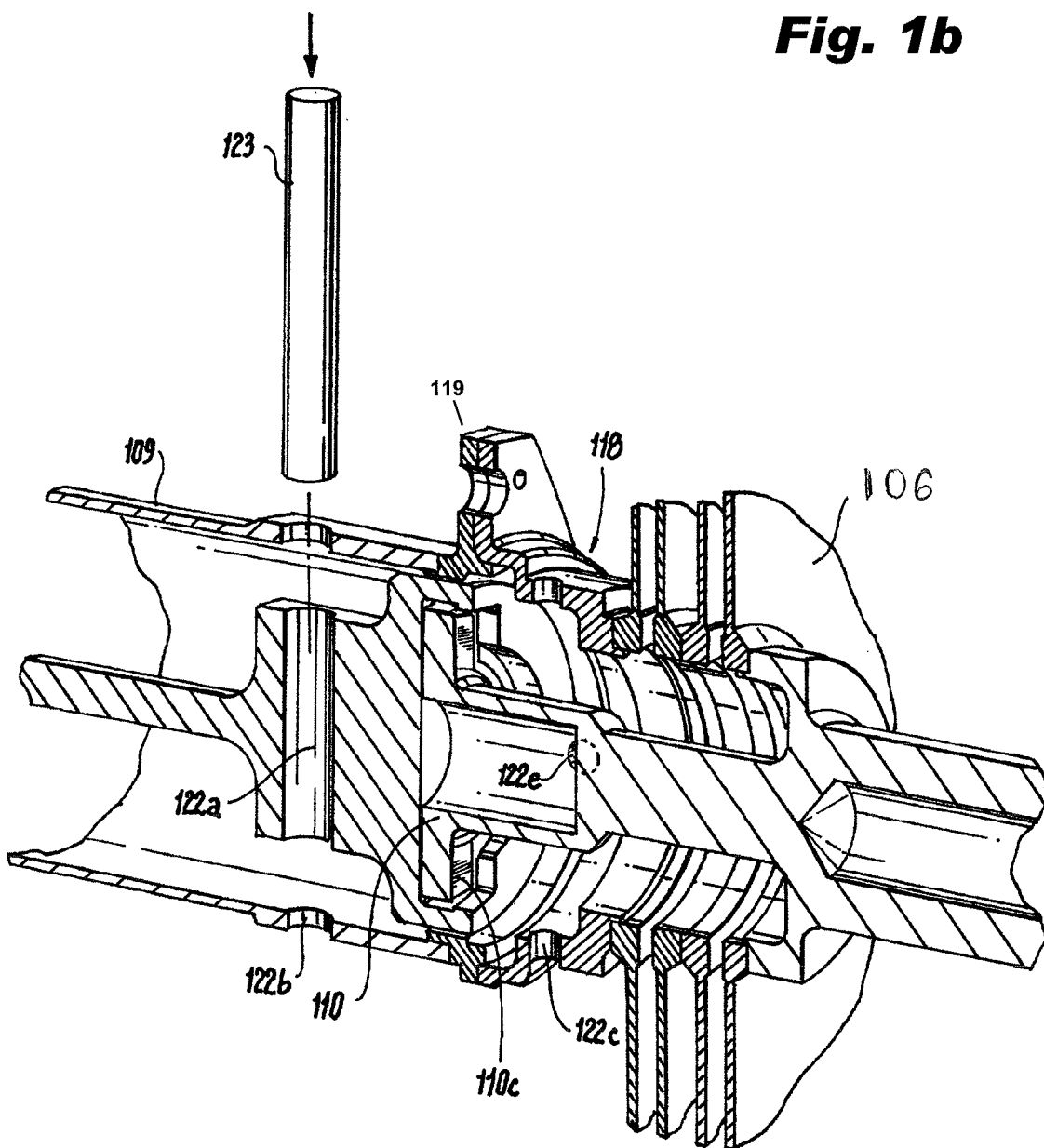
FIG. 1b is a perspective view of FIG. 1, showing the flexible coupling assembly in a connected state.
Figure 1C:
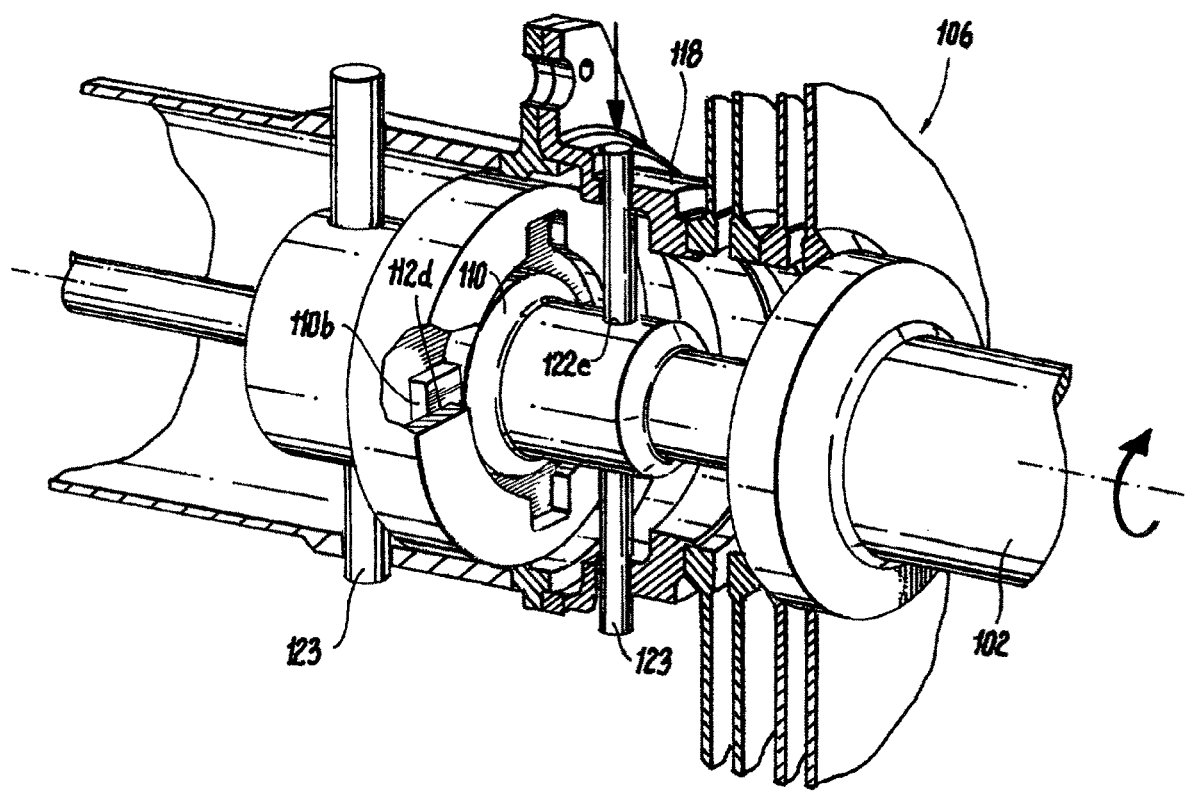
FIG. 1c is an expanded view of a section FIG. 1b, showing the flexible coupling assembly in a locked state.

As shown in FIGS. 1a-1c, the locking flange 110 includes at least one radial protrusion 110b for mating with a cutout of the first mating portion 112 of the quill shaft 108. The at least one radial protrusion 110b can include a wedged section 110c. Upon installation, the radial protrusion 110b is inserted into the cutout and the first shaft 102 is turned. The wedged section 110c mates with a surface 112d of the mating portion 112 and ensures the quill shaft 108 and the first shaft 102 are locked together through friction and pressure. The surface 112d of the mating portion 112 can also include features for locking the wedged sections 110c in place. The locking flange 110 can include multiple protrusions 110b and the quill shaft 108 can have an equal amount of cutouts for receiving said protrusions.

FIG. 1a, shows the radial protrusions 110b and the cutouts separated during installation. At least two flange adapters 118 and 119 are disposed between the primary coupling shaft 109 and the first flexible diaphragm coupling 106. One of the flange adapters 118 can be welded or secured to the flexible diaphragm coupling 106 and the second flange adapter 119 can be welded or secured to the primary diaphragm coupling shaft 109. The flange adapters 118, 119 help assure separation required for installation.

FIG. 1b shows the radial protrusions 110b within the circumferential opening 114. The quill shaft 108 includes at least one pin hole 122a there through, located within the first mating portion 112, arranged perpendicular to the axis 104, and aligned with a primary coupling shaft through hole 122b for receiving a pin 123 therein for locking relative movement of the quill shaft 108 and the primary diaphragm coupling shaft 109. The pin 123 is used during installation and assembly of the shaft and are removed during operation. The first shaft 102 also includes a pin hole there through 122e, arranged perpendicular to the axis 104, for receiving another pin therein for locking relative movement of the first shaft 102 and the first flexible diaphragm coupling. The pin hole 122e is arranged outside of the locking flange 110. The flange adapter 118 also includes a pin hole 122c there through arranged perpendicular to the axis 104 and which is aligned with the first shaft 102 pin hole 122e.

FIG. 1c, shows the radial protrusions 110b in a turned and locked position. The pins 123 are shown within each of the aligned holes 122e and 122a. The pins are used during installation and are to be removed prior to operating the shaft.

The features discussed herein eliminate the need for a typical ball and socket assembly within each coupling. The typically used ball and socket joints are wear items and need to be replaced after a defined number of service hours. The features discussed above greatly improve the Mean Time Between Maintenance Action (MTBMA) versus shafts using ball and socket assemblies. Further, the mechanism allowing the quill shaft 108 to be separable eliminates the restriction of prior art where the quill shaft length is based on the length of one flexible coupling.

The methods and systems of the present disclosure, as described above and shown in the drawings, provide for a flexible coupling assembly with superior properties including increased reliability. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. A flexible coupling assembly for a power transmission system comprising:
   a first shaft defining an axis, configured to connect to a first rotatable member;
   a first flexible diaphragm coupling configured to have a portion of the first shaft pass axially therethrough;
   a quill shaft having a circumferential opening configured to receive the first shaft and receive a locking flange of the first shaft for connecting the quill shaft to the first shaft, the quill shaft further being configured to connect to a second rotating member;
   a primary diaphragm coupling shaft positioned radially outward of the quill shaft; and
   at least one flange adapter disposed between the primary coupling shaft and the first flexible diaphragm coupling, wherein the flange adapter is welded to the diaphragm coupling, and wherein the at least one flange adapter includes a pin hole there through arranged perpendicular to the axis and aligned with a pin hole of the first shaft for receiving a pin therein configured to lock relative movement of the first shaft and the flange adapter, wherein the locking flange includes at least one radial protrusion for mating with a cutout within a first mating portion of the quill shaft.

2. The flexible coupling assembly of claim 1, wherein the quill shaft includes a second mating portion configured for mating with the second rotating member.

3. The flexible coupling assembly of claim 2, wherein the second mating portion is welded to the quill shaft.

4. The flexible coupling assembly of claim 1, wherein the first shaft abuts an outer periphery of the first flexible diaphragm coupling.

5. The flexible coupling assembly of claim 1, wherein the quill shaft includes a pin hole there through, arranged perpendicular to the axis, and aligned with a primary coupling shaft pin hole for receiving a pin therein configured to lock relative movement of the quill shaft and the primary diaphragm coupling shaft during assembly.

6. The flexible coupling assembly of claim 1, wherein a first mating portion of the quill shaft includes a pin hole there through.

7. A flexible coupling assembly for a power transmission system comprising:
   a first shaft defining an axis, configured to connect to a first rotatable member;
   a first flexible diaphragm coupling configured to have a portion of the first shaft pass axially therethrough;
   a quill shaft having a circumferential opening configured to receive the first shaft and receive a locking flange of the first shaft for connecting the quill shaft to the first shaft, the quill shaft further being configured to connect to a second rotating member;
   a primary diaphragm coupling shaft positioned radially outward of the quill shaft; and
   at least one flange adapter disposed between the primary coupling shaft and the first flexible diaphragm coupling, wherein the flange adapter is welded to the diaphragm coupling, and wherein the at least one flange adapter includes a pin hole there through arranged perpendicular to the axis and aligned with a pin hole of the first shaft for receiving a pin therein configured to lock relative movement of the first shaft and the flange adapter, wherein the primary diaphragm coupling shaft includes a radial displacement limiter in an inner cavity thereof for regulating radial movement of the quill shaft within the primary diaphragm coupling shaft.

8. The flexible coupling assembly of claim 7, wherein the radial displacement limiter includes a deformable material.

9. The flexible coupling assembly of claim 7, wherein the radial displacement limiter encloses the quill shaft and abuts against an inner diameter of the primary diaphragm coupling shaft.

10. A flexible coupling assembly for a power transmission system comprising:
    a first shaft defining an axis, configured to connect to a first rotatable member;
    a first flexible diaphragm coupling configured to have a portion of the first shaft pass axially therethrough;
    a quill shaft having a circumferential opening configured to receive the first shaft and receive a locking flange of the first shaft for connecting the quill shaft to the first shaft, the quill shaft further being configured to connect to a second rotating member;
    a primary diaphragm coupling shaft positioned radially outward of the quill shaft; and
    at least one flange adapter disposed between the primary coupling shaft and the first flexible diaphragm coupling, wherein the flange adapter is welded to the diaphragm coupling, and wherein the at least one flange adapter includes a pin hole there through arranged perpendicular to the axis and aligned with a pin hole of the first shaft for receiving a pin therein configured to lock relative movement of the first shaft and the flange adapter, wherein the quill shaft adjoins a second side of a second flexible diaphragm coupling and passes through the second flexible diaphragm coupling.

11. The flexible coupling assembly of claim 10, wherein the primary coupling shaft adjoins a first side of the second flexible diaphragm coupling.

12. A flexible coupling assembly for a power transmission system comprising:
    a first shaft defining an axis, configured to connect to a first rotatable member;
    a first flexible diaphragm coupling configured to have a portion of the first shaft pass axially therethrough;
    a quill shaft having a circumferential opening configured to receive the first shaft and receive a locking flange of the first shaft for connecting the quill shaft to the first shaft, the quill shaft further being configured to connect to a second rotating member;
    a primary diaphragm coupling shaft positioned radially outward of the quill shaft; and
    at least one flange adapter disposed between the primary coupling shaft and the first flexible diaphragm coupling, wherein the flange adapter is welded to the diaphragm coupling, and wherein the at least one flange adapter includes a pin hole there through arranged perpendicular to the axis and aligned with a pin hole of the first shaft for receiving a pin therein configured to lock relative movement of the first shaft and the flange adapter, wherein a mating portion of the quill shaft includes a larger outer diameter than an outer diameter of a non-mating portion of the quill shaft.

* * * * *